(12) United States Patent
Shimodaira

(10) Patent No.: US 11,077,553 B2
(45) Date of Patent: Aug. 3, 2021

(54) ROBOT AND OFFSET CORRECTION DEVICE FOR FORCE SENSOR

(71) Applicant: Seiko Epson Corporation, Tokyo (JP)

(72) Inventor: Yasuhiro Shimodaira, Matsumoto (JP)

(73) Assignee: Seiko Epson Corporation

( * ) Notice: Subject to any disclaimer, the term of this patent is extended or adjusted under 35 U.S.C. 154(b) by 450 days.

(21) Appl. No.: 16/126,024

(22) Filed: Sep. 10, 2018

(65) Prior Publication Data

US 2019/0077017 A1   Mar. 14, 2019

(30) Foreign Application Priority Data

Sep. 11, 2017   (JP) .............................. JP2017-173869

(51) Int. Cl.
*B25J 9/16*     (2006.01)

(52) U.S. Cl.
CPC ........... *B25J 9/1633* (2013.01); *B25J 9/1692* (2013.01)

(58) Field of Classification Search
CPC ...... B25J 9/1633; B25J 9/1692; B25J 9/1602; B25J 9/1694; B25J 13/085
See application file for complete search history.

(56) References Cited

U.S. PATENT DOCUMENTS

| 4,925,312 A * | 5/1990 | Onaga ..................... B25J 9/1633 318/568.22 |
| 2014/0236354 A1 | 8/2014 | Kamiya et al. |
| 2015/0127158 A1 | 5/2015 | Shimodaira |
| 2016/0332306 A1 | 11/2016 | Kamiya et al. |
| 2017/0120450 A1 | 5/2017 | Toyoda et al. |

FOREIGN PATENT DOCUMENTS

| JP | H08-043220 A | 2/1996 |
| JP | 2009-023047 A | 2/2009 |
| JP | 2013-098803 A | 5/2013 |
| JP | 2014-163870 A | 9/2014 |
| JP | 2015-182164 A | 10/2015 |
| JP | 2016-156707 A | 9/2016 |
| JP | 2017-087313 A | 5/2017 |

* cited by examiner

*Primary Examiner* — Basil T. Jos
(74) *Attorney, Agent, or Firm* — Harness, Dickey & Pierce, P.L.C.

(57) ABSTRACT

A robot includes a robot arm, a force sensor that is provided on the robot arm, and a processor that is configured to execute computer-executable instructions so as to control the robot and process a sensor output of the force sensor. The processor is configured to: set an offset calculation period after resetting the force sensor; and perform an offset calculation operation for calculating a value based on the sensor output during the offset calculation period as an offset and a correction operation for subtracting the offset from the sensor output at the time of force detection after the elapse of the offset calculation period.

16 Claims, 13 Drawing Sheets

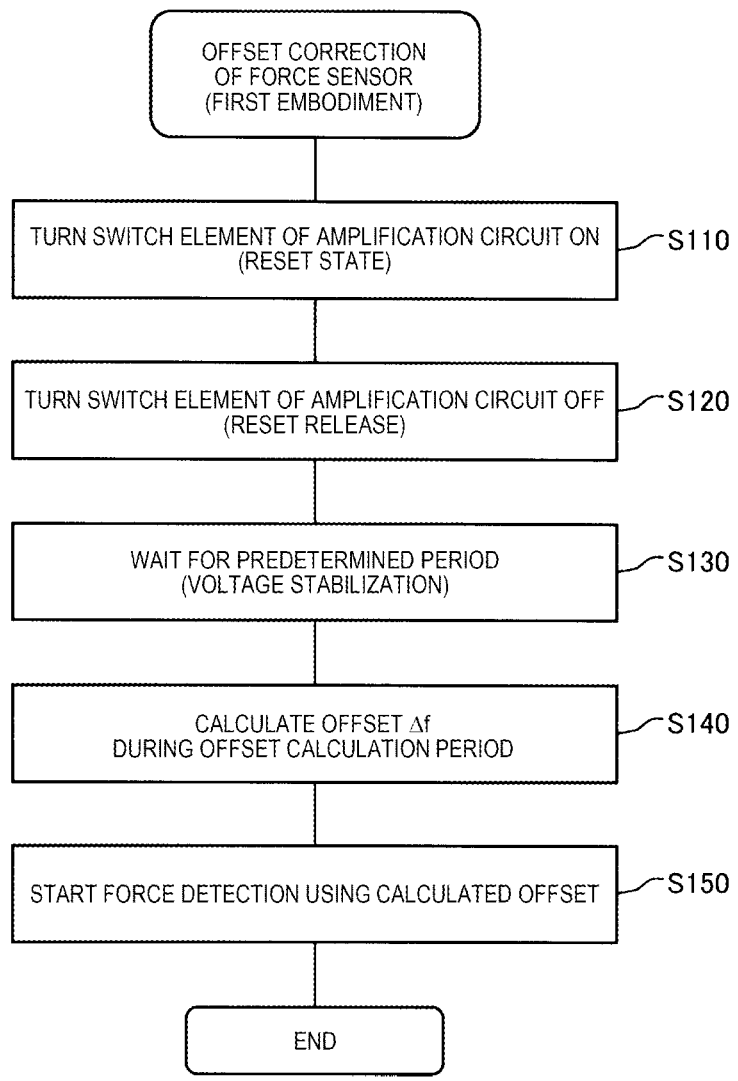

ROBOT AND OFFSET CORRECTION DEVICE FOR FORCE SENSOR

BACKGROUND

1. Technical Field

The present invention relates to a robot including a force sensor and an offset correction device for the force sensor.

2. Related Art

In JP-A-8-43220, a technique for correcting a zero point of a force sensor of a robot is disclosed. In JP-A-8-43220, it is determined whether there is no load or it is under a load state, and a new zero point is determined by using an average value of sampled values of voltage information in a state where it is determined there is no load.

In actual work using the force sensor, a zero point correction of the force sensor is performed before the work is started. At this time, some gravity load, including a top plate structure that stably interacts with the outside, such as sensor top plate and the like, is always applied. Accordingly, the force sensor is always zero-corrected in the load state. However, in JP-A-8-43220 described above, matters that the zero point correction is performed in a no load state, and the inventor of the present application found that there is a problem that even when the robot is in a state of being not in contact with the outside and can be seen stably, a level of the sensor output greatly changes due to external vibration, vibration when the robot is stopped vibration, control vibration, and the like after reset of the force sensor and thus, accurate force detection cannot be performed even if the sensor output immediately after the reset is used for correction as it is.

SUMMARY

An advantage of some aspects of the invention is to solve at least a part of the problems described above, and the invention can be implemented as the following aspects.

According to a first aspect of the invention, a robot including a robot arm is provided. The robot includes a force sensor that is provided on the robot arm and a processing unit that processes a sensor output of the force sensor. The processing unit includes an offset correction unit that sets an offset calculation period after resetting the force sensor and performs an offset calculation operation for calculating a value based on the sensor output during the offset calculation period as an offset and a correction operation for subtracting the offset from the sensor output at the time of force detection after the elapse of the offset calculation period.

According to this robot, since the offset may be calculated during the offset calculation period after the reset of the force sensor and the force sensor may be corrected by using the offset, it is possible to perform accurate force detection according to a load state before starting work. Since the value based on the output of the force sensor during the offset calculation period is obtained as an offset, even in a case where there is a possibility that a level of the sensor output greatly changes after the reset of the force sensor, it is possible to accurately obtain a correct offset.

(2) In the robot, a value based on the sensor output may be an average value of the sensor output during the offset calculation period.

According to this robot, the offset may be easily calculated.

(3) In the robot, the force sensor may include a plurality of force detection units each of which includes a force detection element and an amplification circuit amplifying an output signal of the force detection element, and the offset correction unit may execute the offset calculation operation and the correction operation using the output signal of the amplification circuit as the sensor output.

According to this robot, since the offset calculation operation and the correction operation are executed by using the output signals of the amplification circuits of the plurality of force detection units as the sensor output, it is possible to accurately execute offset correction.

(4) In the robot, the processing unit may further include a force conversion unit that converts an offset-corrected signal obtained by performing the correction operation on an output signal of the amplification circuit of each of the plurality of force detection units into a force signal representing a force relating to each of a plurality of detection axes.

According to this robot, since the force conversion unit converts the offset-corrected signal into the force signal representing the force relating to each of the plurality of detection axes, it is possible to suppress the influence of the offset on the force signal to a small degree and perform force detection with high accuracy.

(5) In the robot, the force sensor may output a force signal representing a force relating to each of a plurality of detection axes and the offset correction unit may execute the offset calculation operation and the correction operation by using the force signal relating to each of the plurality of detection axes as the sensor output.

According to this robot, since the offset calculation operation and the correction operation are executed by using the force signal relating to the plurality of detection axes as the sensor output, it is possible to reduce the influence of the offset in the case where the offset occurs in the force signal relating to each of the plurality of detection axes.

(6) In the robot, the offset correction unit may set the offset calculation period to a period corresponding to N cycles (N is an integer of 1 or more) of natural vibration of an installation portion of the force sensor of the robot arm.

According to this robot, it is possible to accurately obtain the offset.

(7) In the robot, the offset correction unit may set a standby period to wait until the sensor output is stabilized, before the offset calculation period.

According to this robot, since the offset is calculated after the sensor output is stabilized, it is possible to accurately obtain the offset.

(8) A second embodiment of the invention is directed to an offset correction device for correcting an offset of a force sensor. The force sensor correction device includes an offset calculation unit that sets an offset calculation period after resetting the force sensor and calculates a value based on an output of the force sensor during the offset calculation period as an offset and a correction execution unit that subtracts the offset from the output of the force sensor at the time of force detection after the elapse of the offset calculation period.

According to this force sensor correction device, since the offset may be calculated during the offset calculation period after reset of the force sensor and the force sensor may be corrected by using the offset, it is possible to perform accurate force detection according to a load state before starting work. Since the value based on the output of the force sensor during the offset calculation period is obtained as an offset, even in a case where there is a possibility that a level of the sensor output greatly changes after the reset of the force sensor, it is possible to accurately obtain a correct offset.

The invention may be realized in various forms other than those described above. For example, the invention may be realized in the form of a computer program for realizing a function of a robot or a force sensor correction device, a non-transitory storage medium in which the computer program is recorded, and the like.

BRIEF DESCRIPTION OF THE DRAWINGS

The invention will be described with reference to the accompanying drawings, wherein like numbers reference like elements.

FIG. 8 is a flowchart of offset correction processing according to the first embodiment.

DESCRIPTION OF EXEMPLARY EMBODIMENTS

A. First Embodiment

Figure 1:
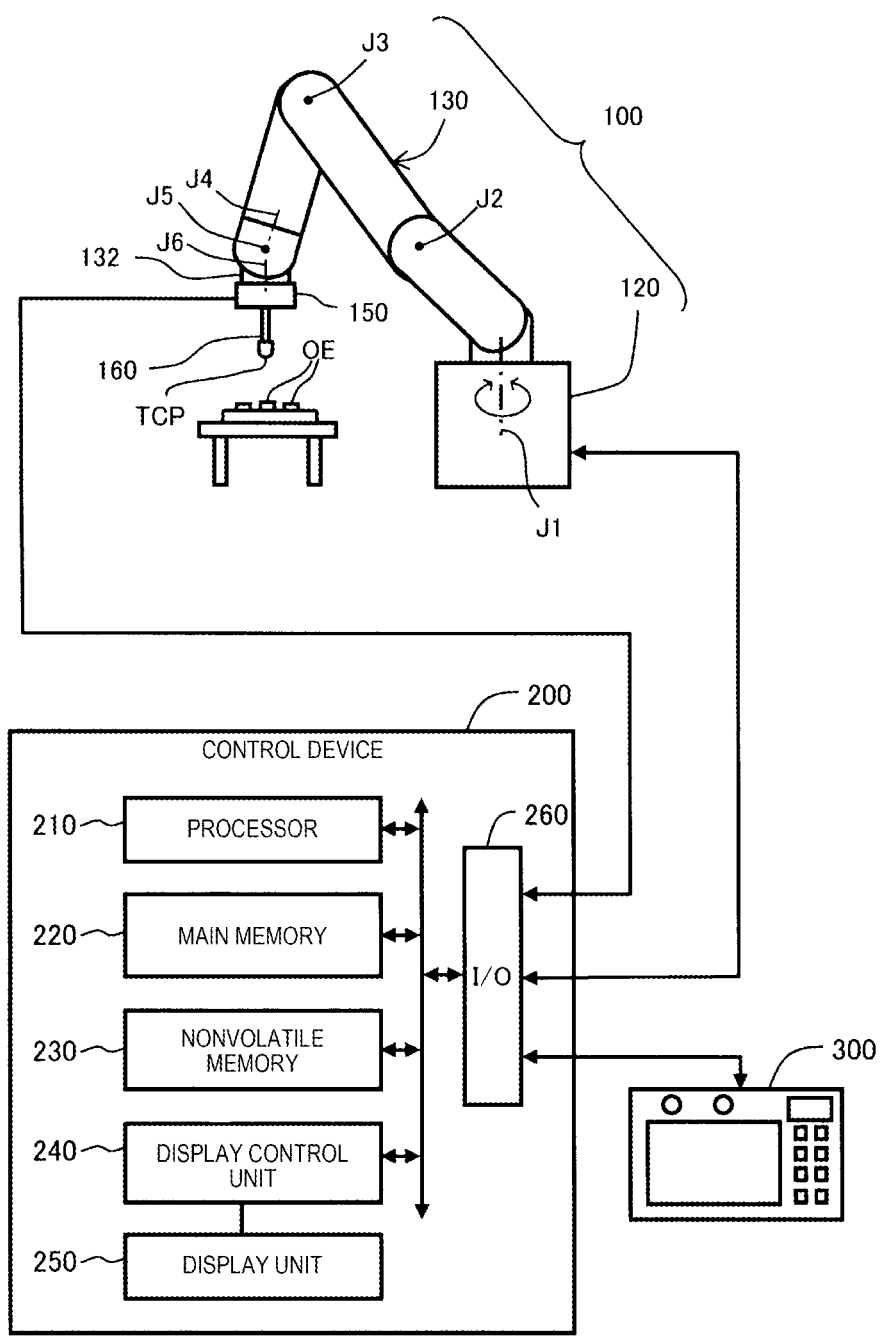
FIG. 1 is a conceptual diagram of a robot system.

FIG. 1 is a conceptual diagram of a robot system according to an embodiment. The robot system includes a robot 100, a control device 200, and a teaching pendant 300. The robot 100 is a teaching playback type robot. The work using the robot 100 is executed in accordance with teaching data or commands prepared in advance.

The robot 100 includes a base 120 and an arm 130. The arm 130 is also called a "robot arm". The arm 130 is sequentially connected by six joints J1 to J6. Among these joints J1 to J6, three joints J2, J3, and J5 are bent joints and the other three joints J1, J4, and J6 are torsion joints. In the first embodiment, a six-axis robot is illustrated, but it is possible to use a robot including any arm mechanism having one or more joints.

A force sensor 150 and an end effector 160 are mounted in this order on an arm end 132 which is a tip end portion of the arm 130. In the example of FIG. 1, the end effector 160 is a straight rod-shaped pushing member used for pushing inspection of an operation component OE. However, any other end effector can be used as the end effector 160. A tool center point (TCP) is set at the tip of the end effector 160. Control of the end effector 160 by the robot 100 includes control to change the position and orientation of the TCP. The position and orientation means a state defined by three coordinate values in a three-dimensional coordinate system and rotation around each coordinate axis.

The force sensor 150 is a sensor that detects a force applied to the end effector 160. As the force sensor 150, it is possible to use a load cell capable of detecting a force in a single axial direction or a force sense sensor or a torque sensor capable of detecting force components in a plurality of axial directions. In the present embodiment, a six-axis force sensor is used as the force sensor 150. The six-axis force sensor detects magnitudes of forces parallel to three detection axes orthogonal to each other in the unique sensor coordinate system and magnitudes of torques around the three detection axes. The force sensor 150 may be provided at a position other than the position of the end effector 160, for example, the force sensor 150 may be provided at one or more joints among the joints J1 to J6.

The control device 200 includes a processor 210, a main memory 220, a nonvolatile memory 230, a display control unit 240, a display unit 250, and an I/O interface 260. These components are connected via a bus. The processor 210 is, for example, a microprocessor or processor circuit. The control device 200 is connected to the force sensor 150, the robot 100, and the teaching pendant 300 via the I/O interface 260.

The teaching pendant 300 is a type of a robot teaching device used when a teaching operator of a human being teaches an operation of the robot 100. The teaching pendant 300 includes a processor and a memory (not illustrated). Teaching data or commands prepared by teaching using the teaching pendant 300 are stored in the nonvolatile memory 230 of the control device 200.

Figure 2:
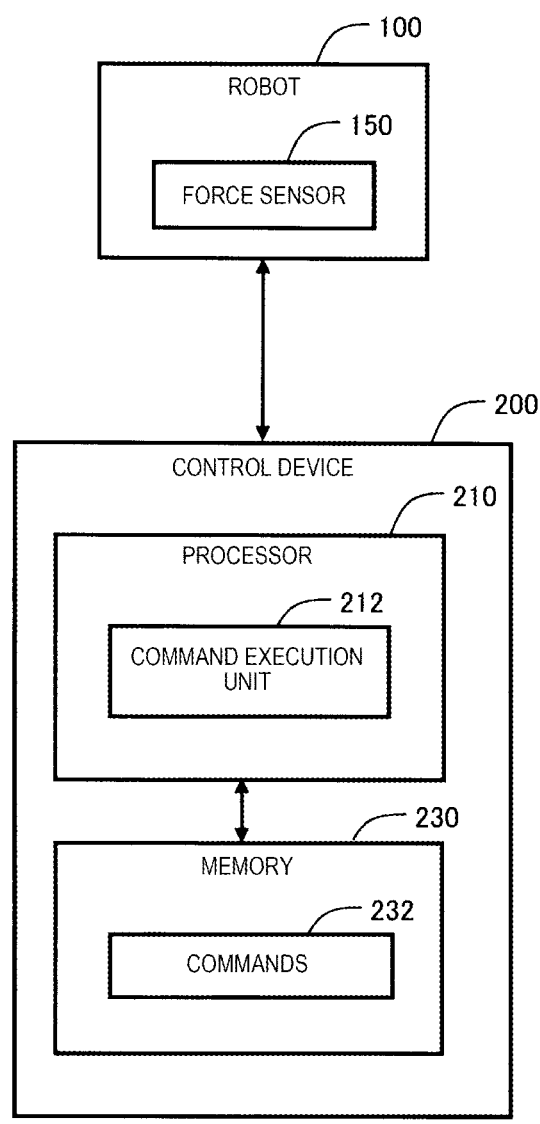
FIG. 2 is a block diagram illustrating functions of a robot and a control device according to a first embodiment.

FIG. 2 is a block diagram illustrating functions of the robot 100 and the control device 200. The processor 210 of the control device 200 realizes the function of a command execution unit 212 that operates the robot 100 by executing various commands 232 stored in the memory 230.

As a configuration of the control device 200, various configurations other than the configurations illustrated in FIG. 1 and FIG. 2 can be adopted. For example, the processor 210 and the main memory 220 may be deleted from the control device 200 of FIG. 1, and the processor 210 and the main memory 220 may be provided in another device communicably connected to the control device 200. In this case, the entire device including the other device and the control device 200 functions as a control device of the robot 100. In another embodiment, the control device 200 may include two or more processors 210. In yet another embodiment, the control device 200 may be realized by a plurality of devices communicably connected to each other. In these various embodiments, the control device 200 is configured as a device or group of devices including one or more processors 210.

Figure 3:
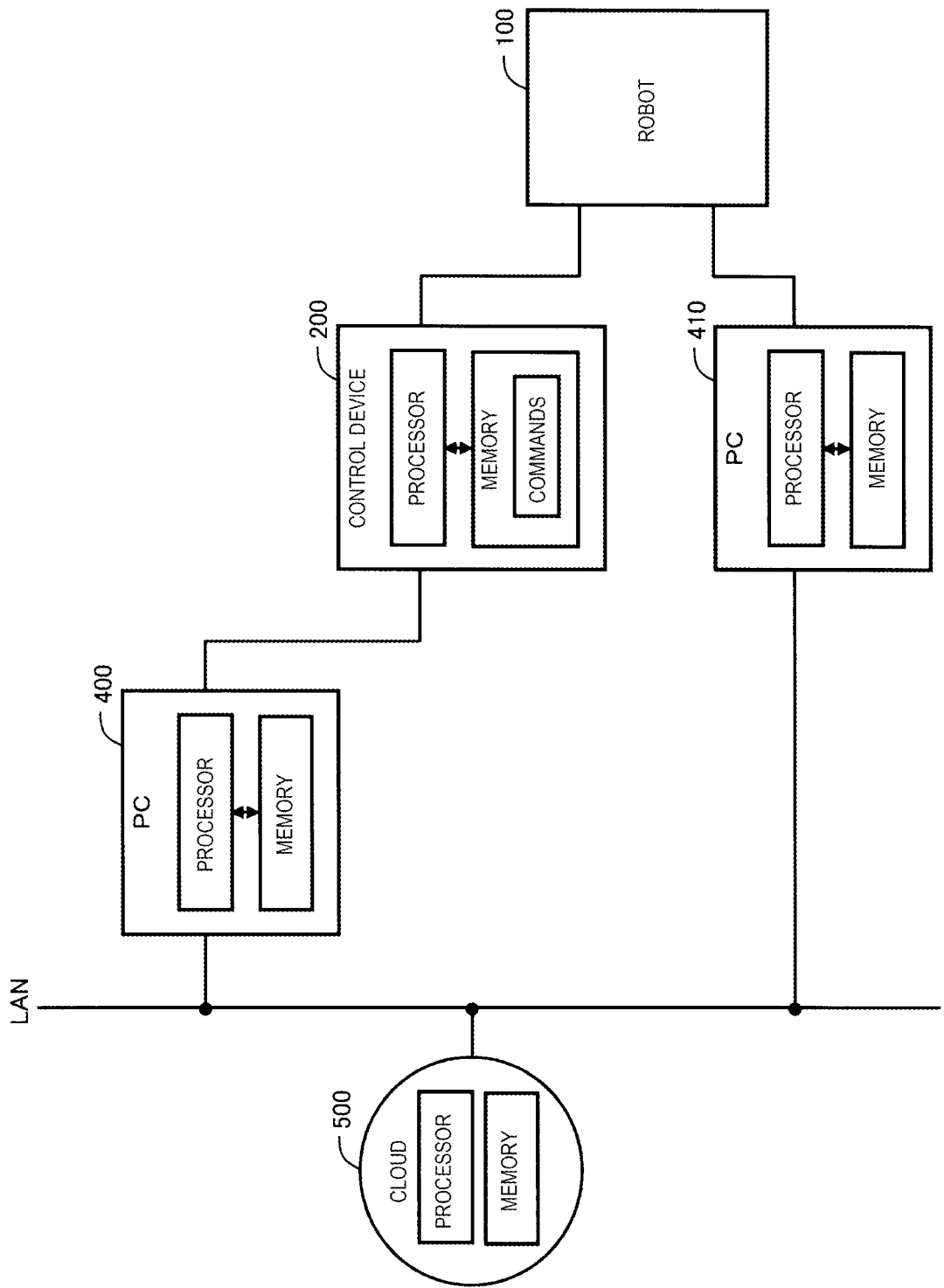
FIG. 3 is a conceptual diagram illustrating an example in which a control device is configured with a plurality of processors.

FIG. 3 is a conceptual diagram illustrating an example in which a control device is configured with a plurality of processors. In this example, in addition to the robot 100 and the control device 200 thereof, personal computers 400 and 410 and a cloud service 500 provided via a network environment such as a LAN are illustrated. Each of the personal computers 400 and 410 includes a processor and a memory. In the cloud service 500, a processor and a memory can also be used. It is possible to realize the control device of the robot 100 by using some or all of these plural processors.

Figure 4:
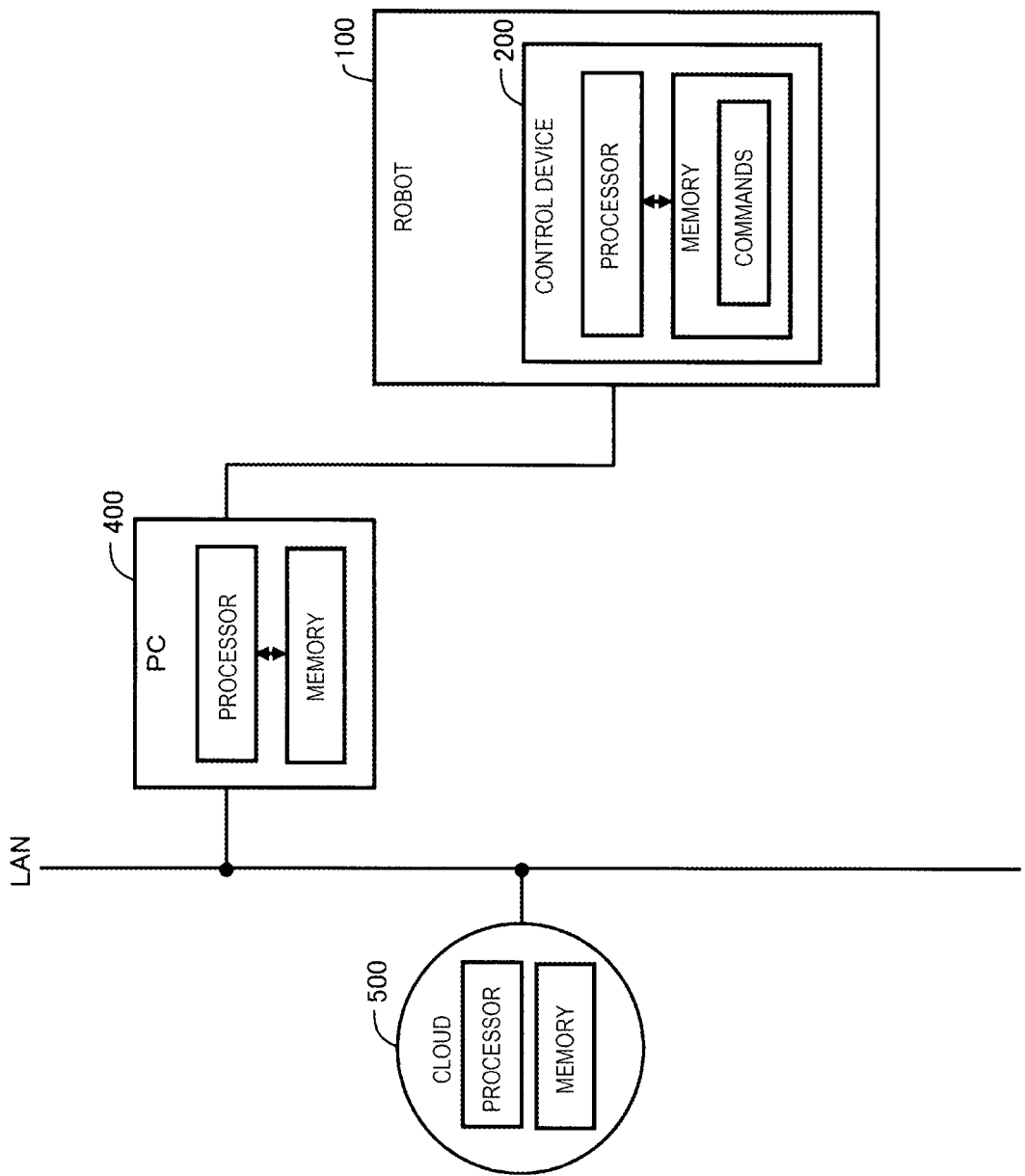
FIG. 4 is a conceptual diagram illustrating another example in which the control device is configured with the plurality of processors.

FIG. 4 is a conceptual diagram illustrating another example in which the control device is configured with a plurality of processors. This example is different from FIG. 3 in that the control device 200 of the robot 100 is stored in the robot 100. Also, in this example, it is possible to realize the control device of the robot 100 by using some or all of the plurality of processors.

Figure 5:
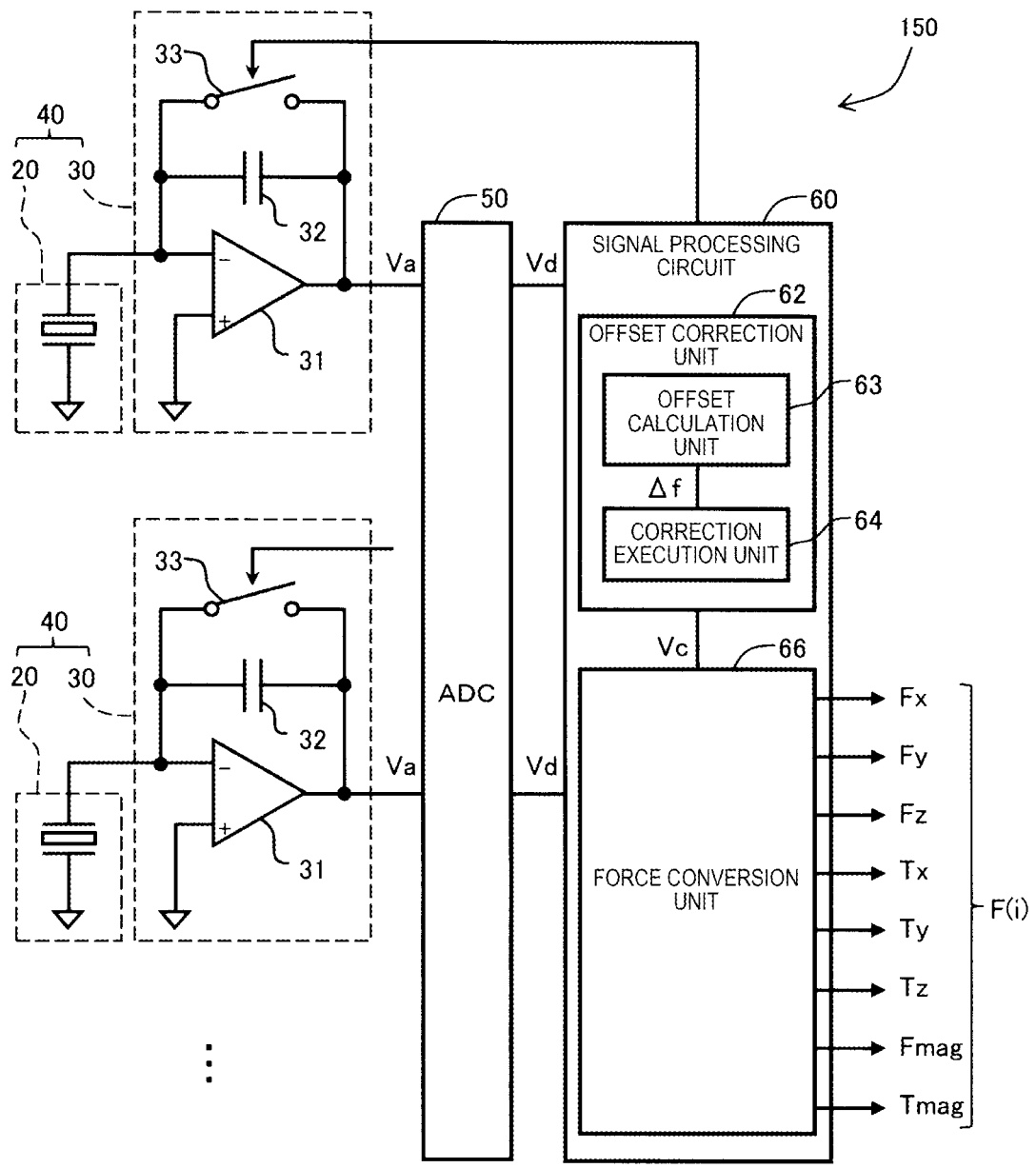
FIG. 5 is a circuit diagram illustrating an example of an internal configuration of a force sensor.

FIG. 5 is a circuit diagram illustrating an example of an internal configuration of the force sensor 150. The force sensor 150 includes a plurality of force detection units 40, an A/D conversion circuit 50, and a signal processing circuit 60. Each force detection unit 40 includes a force detection element 20 and an amplification circuit 30 that amplifies an output signal of the force detection element 20. The amplification circuit 30 supplies an amplified signal Va to the A/D conversion circuit 50. The A/D conversion circuit 50 supplies a digital conversion signal Vd to the signal processing circuit 60. The number of the force detection units 40 is set according to the number of detection axes to be detected by the force sensor 150 and the type of force relating to each detection axis. For example, in a case where the force sensor 150 detects magnitudes of forces parallel to three detection axes orthogonal to each other and magnitudes of torques about three detection axes, twelve force detection units 40 are used. A specific example of the configuration of the force detection unit 40 is described in detail in, for example, Japanese Patent Application Laid-open No. 2014-163870 disclosed by the applicant of the invention and thus, description thereof will be omitted here.

As the force detection element 20, for example, various elements such as a piezoelectric type element, a strain gauge type element, an optical type element, and the like can be used. In the first embodiment, the force detection element 20 using quartz as a piezoelectric member is used, and the force detection element 20 outputs electric charges corresponding to an external force applied from the outside.

The amplification circuit 30 is configured as an integration circuit that integrates the electric charges output from the force detection element 20 and converts the integrated electric charges into the voltage signal Va. Specifically, the amplification circuit 30 includes an operational amplifier 31, a capacitor 32, and a switch element 33. A negative input terminal of the operational amplifier 31 is connected to an electrode of the force detection element 20, and a positive input terminal of the operational amplifier 31 is grounded to ground (reference potential point). The output terminal of the operational amplifier 31 is connected to the A/D conversion circuit 50. The capacitor 32 is connected between the negative input terminal and the output terminal of the operational amplifier 31. The switch element 33 is connected in parallel with the capacitor 32. The switch element 33 executes a switching operation according to an ON/OFF signal supplied from the signal processing circuit 60.

In a case where the switch element 33 is turned OFF, the electric charges output from the force detection element 20 is stored in the capacitor 32, and the voltage Va thereof is output to the A/D conversion circuit 50. On the other hand, when the switch element 33 is turned ON, both terminals of the capacitor 32 are short-circuited. As a result, the electric charges accumulated in the capacitor 32 are discharged and becomes zero, and the voltage Va output to the A/D conversion circuit 50 becomes 0 volts. The operation of turning ON the switch element 33 corresponds to resetting of the force sensor 150.

The signal processing circuit 60 includes an offset correction unit 62 and a force conversion unit 66. The offset correction unit 62 includes an offset calculation unit 63 and a correction execution unit 64, and outputs an offset-corrected signal Vc. Contents of offset correction by the offset correction unit 62 will be described later. The signal processing circuit 60 corresponds to "a processing unit that processes a sensor output of a force sensor".

The force conversion unit 66 converts outputs of the plurality of force detection units 40 into force signals F(i) representing forces related to a plurality of detection axes and outputs the force signals F(i). The force signals F(i) are also simply referred to as "forces F(i)". In the example of FIG. 5, these forces F(i) include forces Fx, Fy, and Fz parallel to three detection axes orthogonal to each other and torques Tx, Ty, and Tz around three detection axes. The force F(i) further includes force vector magnitude Fmag having the forces Fx, Fy, and Fz parallel to the three detection axes as three axial components and torque vector magnitude Tmag having torques Tx, Ty, and Tz around the three detection axes as three axial direction components. The magnitude Fmag of the force vector is a square root of the sum of squares of the three forces Fx, Fy, and Fz, and the magnitude Tmag of the torque vector is a square root of the sum of squares of the three torques Tx, Ty, and Tz. However, these magnitudes Fmag and Tmag can be omitted. The force F(i) output from the signal processing circuit 60 is supplied to the control device 200 of the robot 100 and used for controlling the force of the robot 100 by the control device 200.

Figure 6A:
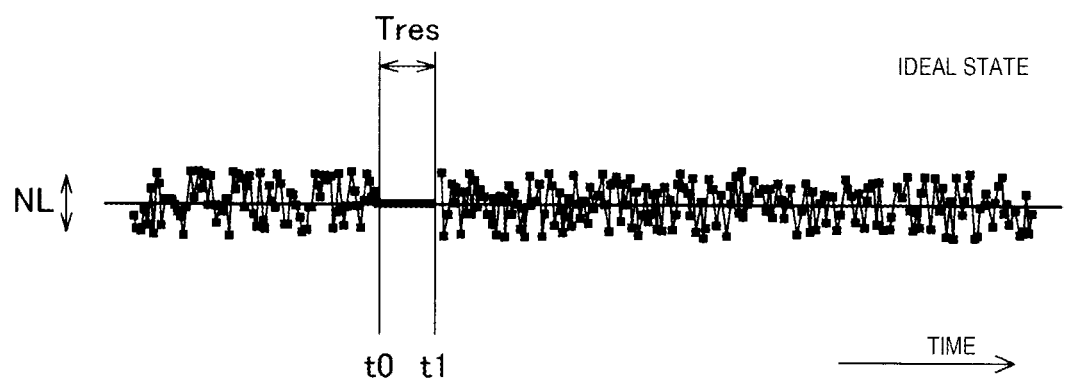
FIG. 6A is an explanatory diagram for explaining a problem of offset due to reset of a force sensor.
Figure 6B:
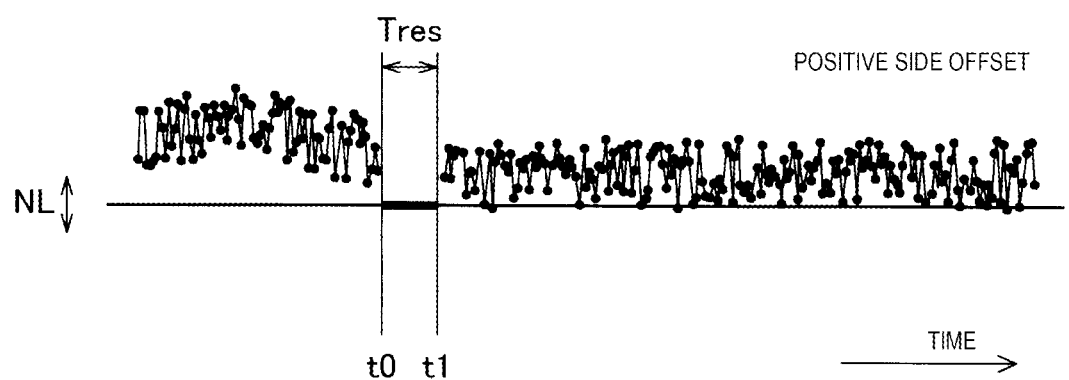
FIG. 6B is another explanatory diagram for explaining the problem of offset due to reset of a force sensor.
Figure 6C:
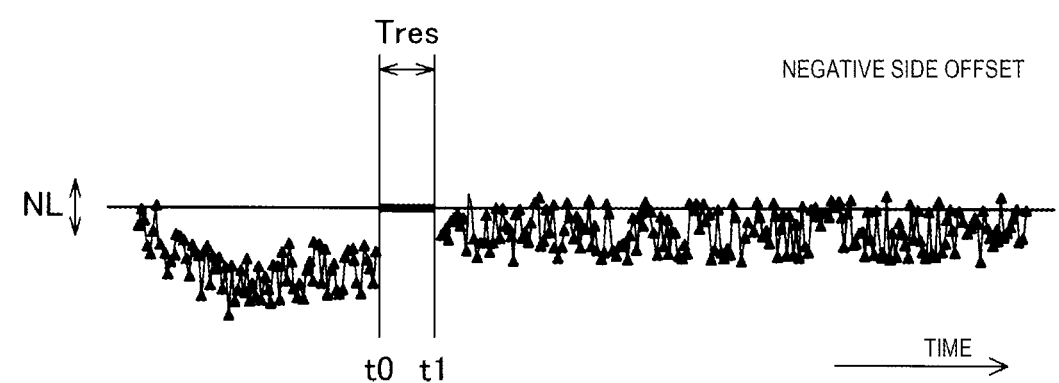
FIG. 6C is another explanatory diagram for explaining the problem of offset due to reset of the force sensor.

FIGS. 6A to 6C are explanatory diagrams for explaining a problem of offset due to reset of the force sensor 150. Here, three types of sensor outputs observed when the arm 130 of the robot 100 is in a stationary state with the same orientation are illustrated. In the description of FIGS. 6A to 6C and FIGS. 7A to 7C to be described later, "sensor output" means the output of the amplification circuit 30 of the force detection unit 40 (FIG. 5). In the individual sensor outputs illustrated in FIGS. 6A to 6C, the output value varies with approximately the same noise level NL. The inventors of the present application found that the noise level NL may be considerably greater than a noise level of the specification of the force sensor 150 in some cases. Specifically, according to mass of the end effector 160 attached to the tip end portion of the force sensor 150, a large noise (disturbance vibration) not desired by the user is observed. The reason is presumed to be due to the matters that the force sensor 150 detects the interaction of vibration around the end effector 160, minute vibration caused by resonance of motor control and suppression of movement due to inertia of the end effector 160 and a noise which greatly exceeds a noise level when the force sensor 150 is in an ideal state (state in which nothing is attached to the force sensor 150) is observed. Actually, a case where the noise level NL is increased to about 10 times the noise level of the specification of the force sensor 150 was observed that.

In a case where there is such a large noise level NL, if the force sensor 150 is reset, the sensor output may be greatly shifted after the reset. In the example of FIGS. 6A to 6C, the force sensor 150 is reset at time t0, and the reset is released at time t1 after the elapse of a reset period Tres. As described above, the reset period Tres is a period during which the switch element 33 of the amplification circuit 30 of the force detection unit 40 is in the ON state. The three types of sensor outputs after the reset are offset from the sensor output (0 V) of the reset period Tres, and the offset amounts of the sensor outputs are greatly different from each other. This is presumed to be because an offset within the range of the noise level NL is superimposed on the sensor output in accordance with the timing of reset release. Accordingly, there is a case where an offset substantially equal to the noise level NL occurs at the maximum, whereas there is a case where almost no offset occurs at the minimum (ideal state of FIG. 6A). Since the offset amount depends on the timing of reset release and the noise level at that time, it is impossible to predict the offset amount in advance.

Figure 7A:
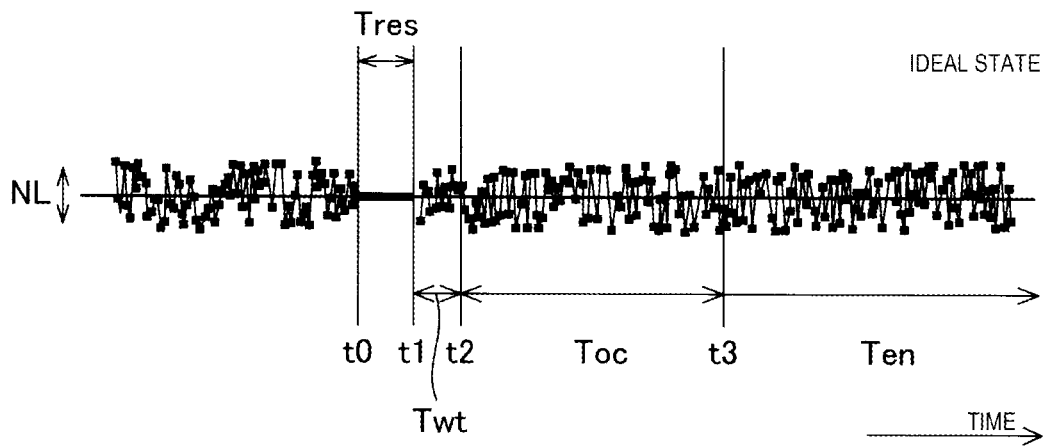
FIG. 7A is a timing chart of offset correction processing according to the first embodiment.
Figure 7B:
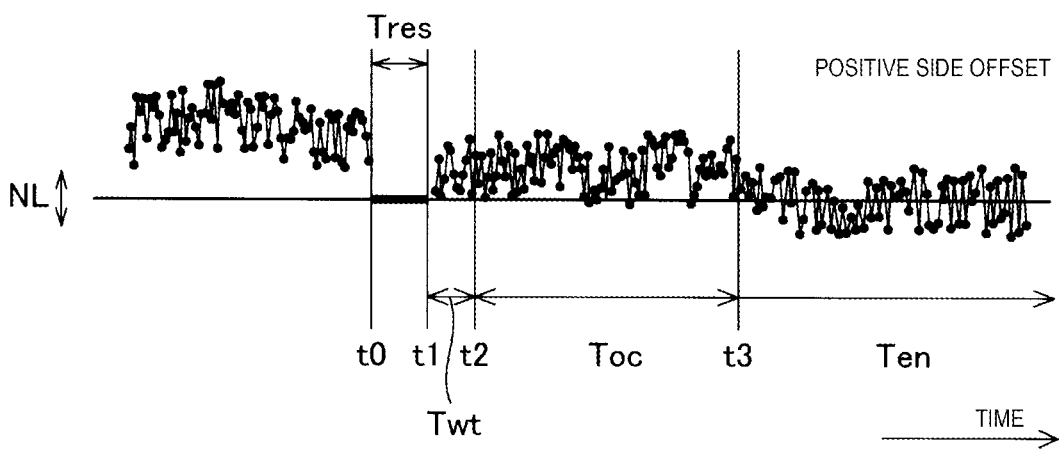
FIG. 7B is another timing chart of offset correction processing in the first embodiment.
Figure 7C:
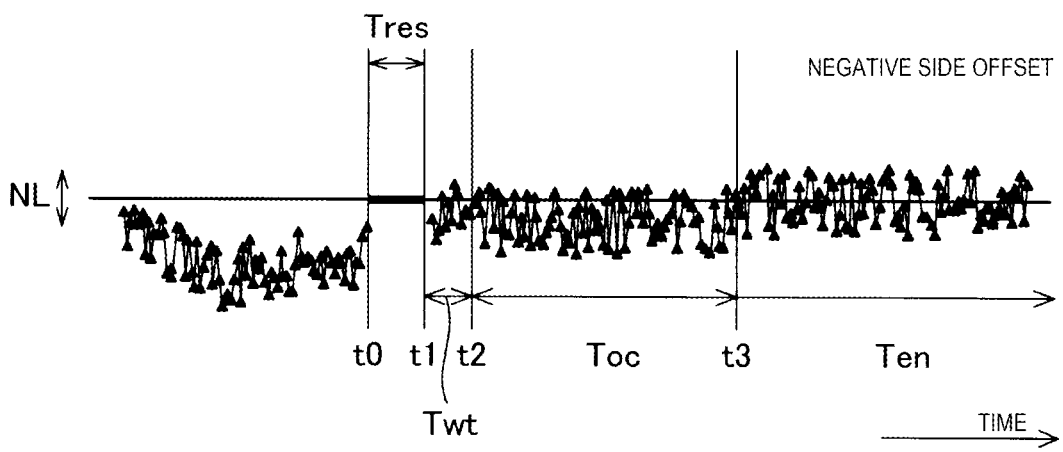
FIG. 7C is another timing chart of offset correction processing in the first embodiment.

FIGS. 7A to 7C are timing charts of offset correction processing in the first embodiment. Offset correction processing is executed by the offset correction unit 62 (FIG. 5). Here, first, similarly to FIGS. 6A to 6C, the force sensor 150 is reset at time t0, and the reset is released at time t1 after the elapse of the reset period Tres. Thereafter, a standby period Twt from time t1 to time t2 is set. The standby period Twt is a period of waiting until the sensor output is stabilized. However, the standby period Twt may be omitted.

During an offset calculation period Tco from time t2 to time t3, the offset calculation unit 63 executes an offset calculation operation for calculating an offset $\Delta f$. Specifically, the offset calculation unit 63 calculates an average value of the sensor outputs during the offset calculation period Tco as the offset $\Delta f$. However, another value other than the average value of the sensor outputs and calculated based on the sensor outputs may be used as the offset $\Delta f$. However, if the average value of the sensor outputs is used, the offset $\Delta f$ can be easily calculated. In the first embodiment, the offset $\Delta f$ is calculated for each force detection unit 40. The calculated offset $\Delta f$ is supplied from the offset calculation unit 63 to the correction execution unit 64.

It is preferable that the offset calculation period Tco is set to a period corresponding to N cycles (N is an integer of 1 or more) of natural vibration of an installation portion of the force sensor 150 in the arm 130. The natural vibration can be detected by analyzing the sensor output Vd by the signal processing circuit 60. The signal processing circuit 60 can detect the natural frequency of the installation portion of the force sensor 150 by, for example, applying fast Fourier transform processing to the sensor output Vd. Since vibration of the sensor output Vd contains also the natural vibration of the installation portion of the force sensor 150, if the offset calculation period Tco is set to a period corresponding to N cycles (N is an integer of 1 or more) of the natural vibration of the installation portion, it is possible to more accurately obtain the offset $\Delta f$. If N is set to a very large value, a long time is required for offset correction and thus, N is preferably set to a value between 1 and 2. A "period corresponding to N cycles of natural vibration" may include an allowable error, and an error of ±10% is allowed when the "period equal to the N cycles of the natural vibration" is set to 100%.

A period after the elapse of the offset calculation period Tco is a force detection execution period Ten. In the force detection execution period Ten, the correction execution unit 64 executes a correction operation for subtracting the offset $\Delta f$ from the sensor output according to the following expression.

$$Vc = Vd - \Delta f \quad (1)$$

where, Vc is an offset-corrected signal and Vd is a sensor output before correction. In the example of FIG. 5, the sensor output Vd before correction is a digital signal obtained by allowing the output signal Va of the amplification circuit 30 of each force detection unit 40 to be subjected to digital conversion.

In FIGS. 7A to 7C, the force detection execution period Ten at and after time t3 indicates the offset-corrected signal Vc obtained by the above equation (1). In the offset-corrected signal Vc, the offset is eliminated in any of the cases of FIGS. 7A to 7C. The offset-corrected signals Vc obtained with respect to the outputs Vd of the plurality of force detection units 40 are supplied to the force conversion unit 66. The force conversion unit 66 converts these plurality of offset-corrected signals Vc into force signals F(i) representing forces related to a plurality of detection axes. In the example of FIG. 5 described above, each of the force signals F(i) output from the force conversion unit 66 is a signal representing the forces Fx, Fy, and Fz parallel to three detection axes orthogonal to each other and torques around the three detection axes Tx, Ty, and Tz, magnitude of the force vector Fmag, and magnitude of the torque vector Tmag. The conversion processing of the force conversion unit 66 is executed using, for example, a transformation matrix set by calibration of the force sensor 150. Since contents of conversion processing are well-known, description thereof will be omitted here.

FIG. 8 is a flowchart of offset correction processing in the first embodiment. The offset correction processing is executed in a state in which the TCP is at a predetermined reference position with respect to a workpiece (in the case of FIG. 1, the operation component OE), before starting work, using the end effector 160. In step S110, the switch element 33 of the amplification circuit 30 is turned ON and the reset is started (time t1 in FIGS. 7A to 7C). In step S120, the switch element 33 of the amplification circuit 30 is turned OFF to release the reset state (time t2 in FIGS. 7A to 7C). Thereafter, in step S130, it waits until the output of the amplification circuit 30 becomes stable (standby period Twt in FIGS. 7A to 7C). In step S140, in the offset calculation period Toc, a value based on the sensor output is calculated as the offset $\Delta f$. In step S150, force detection is started using the calculated offset $\Delta f$. Specifically, the correction execution unit 64 executes the correction operation of subtracting the offset $\Delta f$ from the sensor output and the force conversion unit 66 converts the plurality of offset-corrected signals into force signals F(i) related to the plurality of detection axes.

As described above, in the first embodiment, the offset calculation period Toc is set after resetting the force sensor 150, and the offset calculation operation for calculating the value based on the sensor output in the offset calculation period Toc as the offset $\Delta f$ and the correction operation for subtracting the offset $\Delta f$ from the sensor output at the time of detecting the force after the elapse of the offset calculation period Toc are executed. As a result, even in a case where there is a possibility that a large offset will occur after resetting the force sensor 150, since the force sensor 150 can be corrected using the offset, it is possible to perform accurate force detection according to the load state before starting work. Further, since the value based on the sensor output in the offset calculation period Toc is obtained as the offset $\Delta f$, even in a case where there is a possibility that the level of the sensor output greatly changes after the reset of the force sensor 150, it is possible to accurately determine the correct offset $\Delta f$.

B. Second Embodiment

Figure 9:
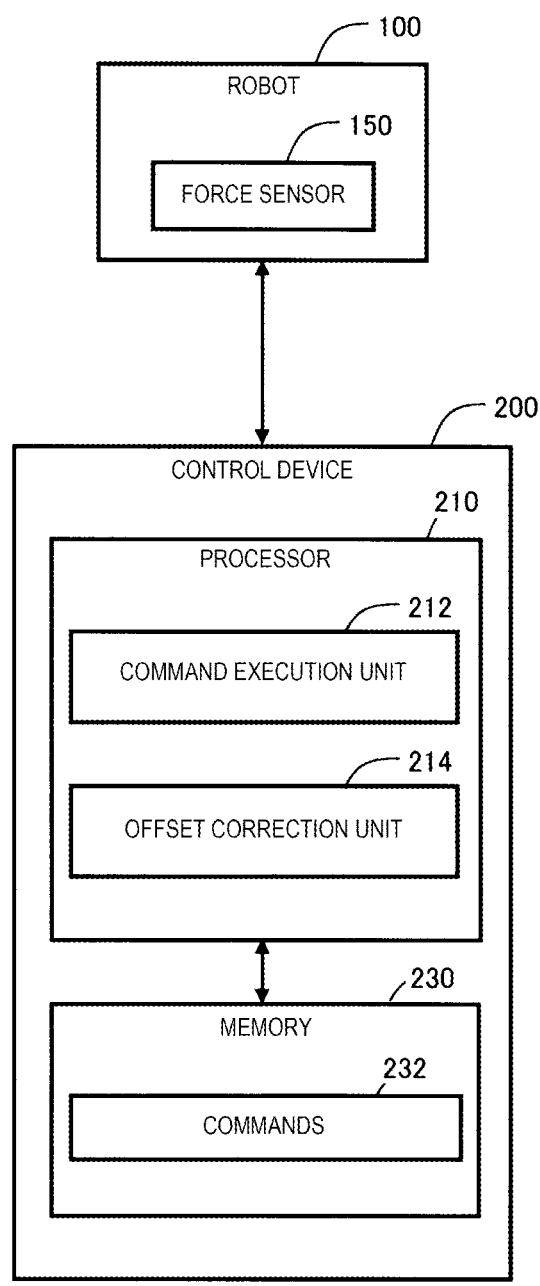
FIG. 9 is a block diagram illustrating functions of a robot and a control device according to a second embodiment.

FIG. 9 is a block diagram illustrating functions of the robot 100 and the control device 200 in a second embodiment. The difference from the first embodiment illustrated in FIG. 2 is that the function of an offset correction unit 214 is executed by the processor 210 of the control device 200. In the second embodiment, the offset correction unit 62 in the signal processing circuit 60 of the force sensor 150 illustrated in FIG. 5 is omitted, and force conversion unit 66 converts the signal Vd obtained by digitally converting the output Va of each of the plurality of force detection units 40 into the force signal F(i) to be output. In the second embodiment, the processor 210 corresponds to a "processing unit that processes the sensor output of the force sensor".

The offset correcting unit 214 calculates each offset relating to each of the plurality of force signals F(i) by executing offset correction using each of the plurality of force signals F(i) supplied from the force sensor 150 as a sensor output. Each offset relating to the plurality of force signals F(i) is a value obtained by averaging the force signals F(i) supplied from the force sensor 150 during the offset calculation period.

In the second embodiment, the offset-corrected signal F(i) is calculated by the following equation instead of the equation (1) described above.

$$Fc(i)=F(i)-\Delta F(i) \qquad (2)$$

where, F(i) is the sensor output before correction, and $\Delta F(i)$ is the offset of the sensor output F(i). The command execution unit 212 can execute force control using the offset-corrected signal Fc(i).

Instead of subtracting the offset $\Delta F(i)$ from the force sensor output F(i) according to the above equation (2), a target value of the force designated in the command 232 for operating the robot 100 may be corrected using the $\Delta F(i)$. The correction processing is given by the following equation.

$$^tFc(i)=^tF(i)+\Delta F(i) \qquad (3)$$

where, $^tFc(i)$ is the target value of a force after correction, $^tF(i)$ is the target value of the force before correction, and $\Delta F(i)$ is the offset of the sensor output F(i).

The correction processing according to the equation (3) can be performed before executing the work according to the command 232. The correction processing is equivalent to the correction processing according to the equation (2) described above.

Figure 10:
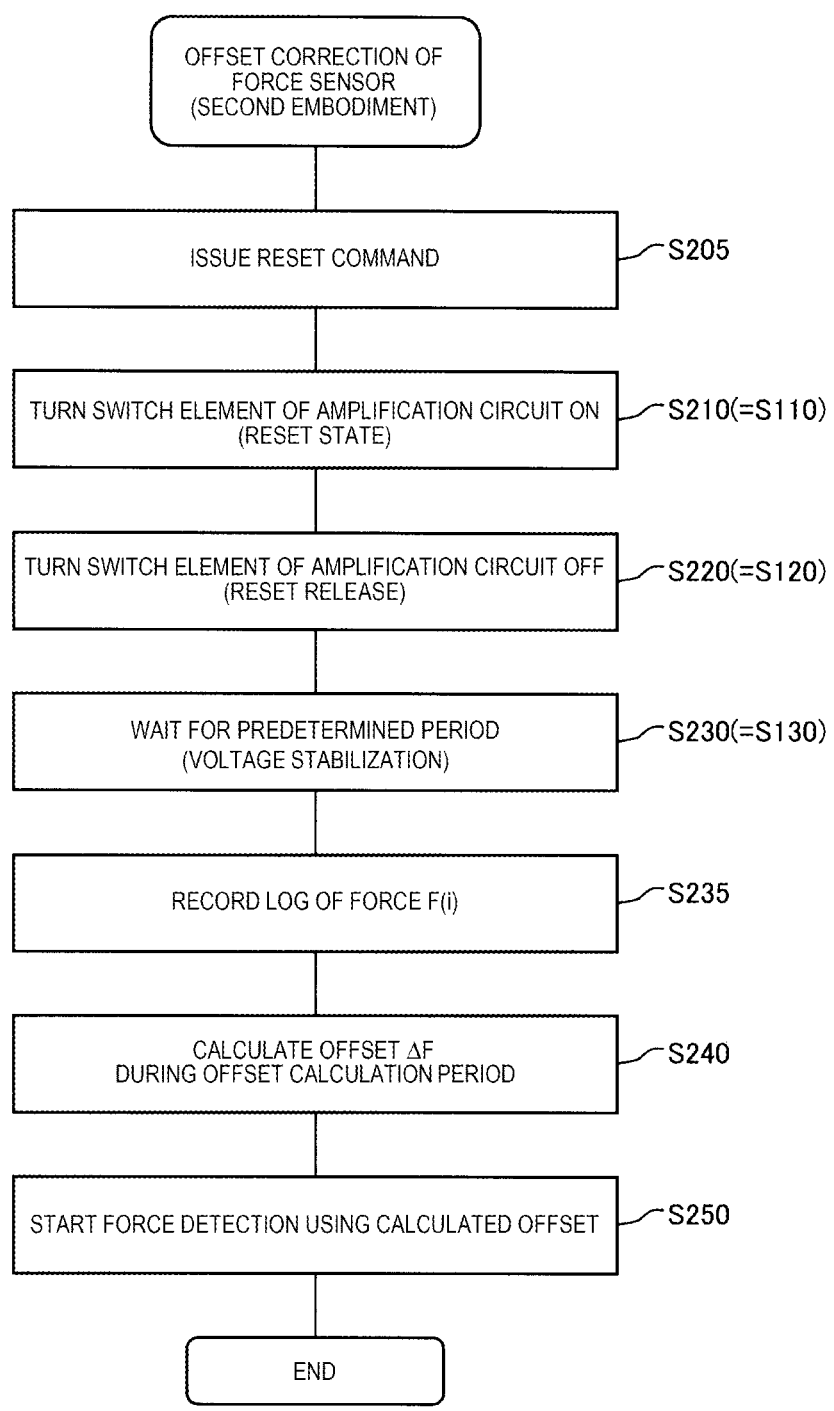
FIG. 10 is a flowchart of offset correction processing according to a second embodiment.

FIG. 10 is a flowchart of offset correction processing according to the second embodiment. In step S205, the offset correction unit 214 issues a reset command to the force sensor 150. The following steps S210 to S230 are the same processing as steps S110 to S130 in FIG. 8. That is, in step S210, the force sensor 150 turns ON the switch element 33 of the amplification circuit 30 and the reset is started (time t1 in FIGS. 7A to 7C). In step S220, the force sensor 150 turns OFF the switch element 33 of the amplification circuit 30 to release the reset (time t2 in FIGS. 7A to 7C). In step S230, it waits until the output of the amplification circuit 30 is stabilized (standby period Twt in FIGS. 7A to 7C). In step S235, a log of the sensor output F(i) thereafter is recorded in the offset correction unit 214. In step SS40, a value (for example, an average value) based on the sensor output F(i) is calculated as the offset $\Delta F(i)$ in the offset calculation period Toc. In step S250, force detection is started using the calculated offset $\Delta F(i)$. Specifically, the offset correction unit 214 executes the correction operation of subtracting the offset $\Delta F(i)$ from the sensor output F(i) relating to the plurality of detection axes.

Also, in the second embodiment, similarly as in the first embodiment, the offset calculation period Toc is set after resetting the force sensor 150, the offset calculation operation for calculating the value based on the sensor output F(i) in the offset calculation period Toc as the offset $\Delta F(i)$ and the correction operation for subtracting the offset $\Delta F(i)$ from the sensor output F(i) at the time of force detection after the elapse of the offset calculation period Toc. As a result, even in the case where there is a possibility that a large offset occurs after resetting the force sensor 150, since the force sensor 150 can be corrected using the offset, it is possible to perform accurate force detection according to a load state before starting work. Also, since the value based on the sensor output F(i) during the offset calculation period Toc is obtained as the offset $\Delta F(i)$, even in a case where there is a possibility that the level of the sensor output F(i) changes greatly after the reset of the force sensor 150, it is possible to accurately obtain the correct offset $\Delta F(i)$.

However, accuracy of the offset correction is higher in the first embodiment than in the second embodiment, so that the first embodiment is preferable. The reason why accuracy of the offset correction is higher in the first embodiment is presumed to be that the offset correction is performed on the output of the circuit where the offset occurs (force detection unit 40 in FIG. 5).

C. Third Embodiment

Figure 11:
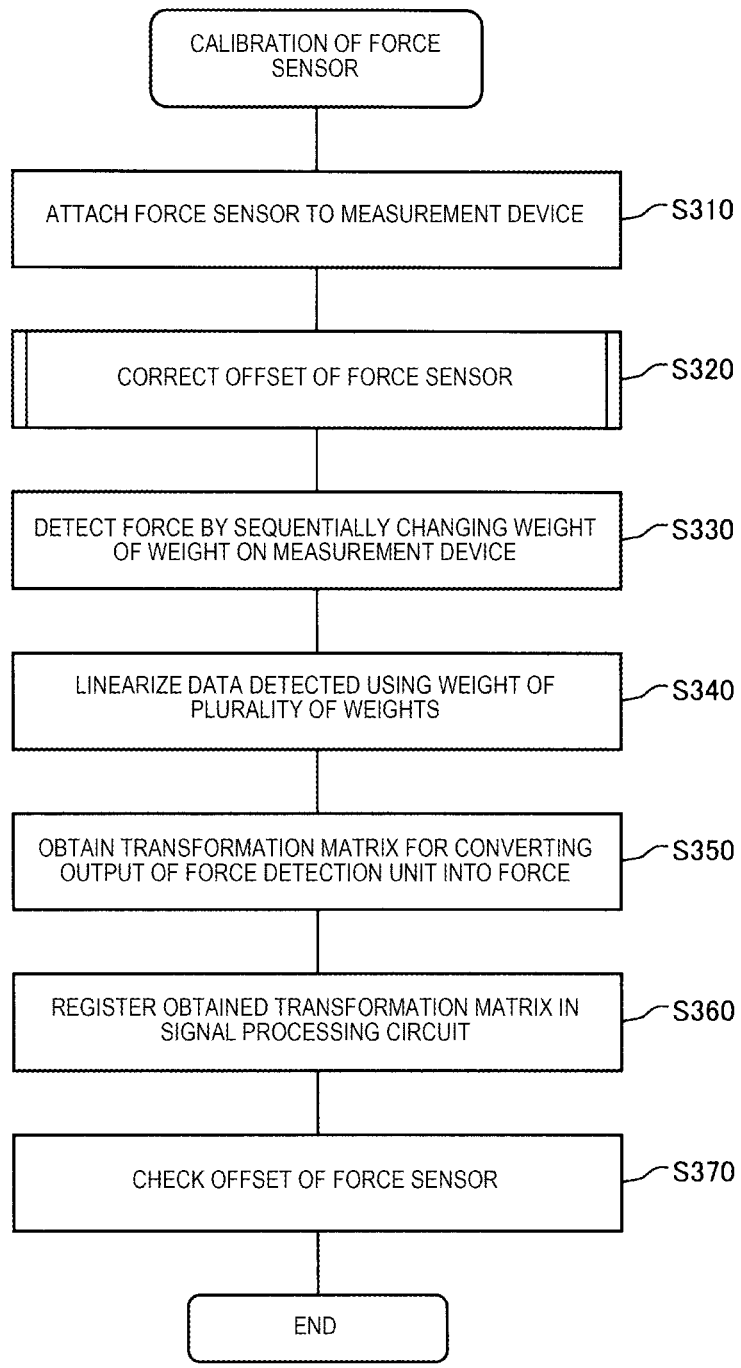
FIG. 11 is a flowchart of sensor calibration according to a third embodiment.

FIG. 11 is a flowchart of calibration processing of the force sensor 150 executed according to a third embodiment. The calibration processing is processing of obtaining a transformation matrix for converting outputs of the plurality of force detection units 40 to the forces F(i) relating to a plurality of detection axes before mounting the force sensor 150 to the robot 100. In the third embodiment, offset correction is performed for the output of each force detection unit 40, in calibration processing. Processing in FIG. 11 can be executed using, for example, the personal computer 400 illustrated in FIG. 3.

In step S310, the force sensor 150 is attached to a measurement device. The measurement device is a device for highly accurately measuring the forces F(i) to be detected by the force sensor 150 with respect to the plurality of detection axes x, y, and z of the force sensor 150.

Figure 12:
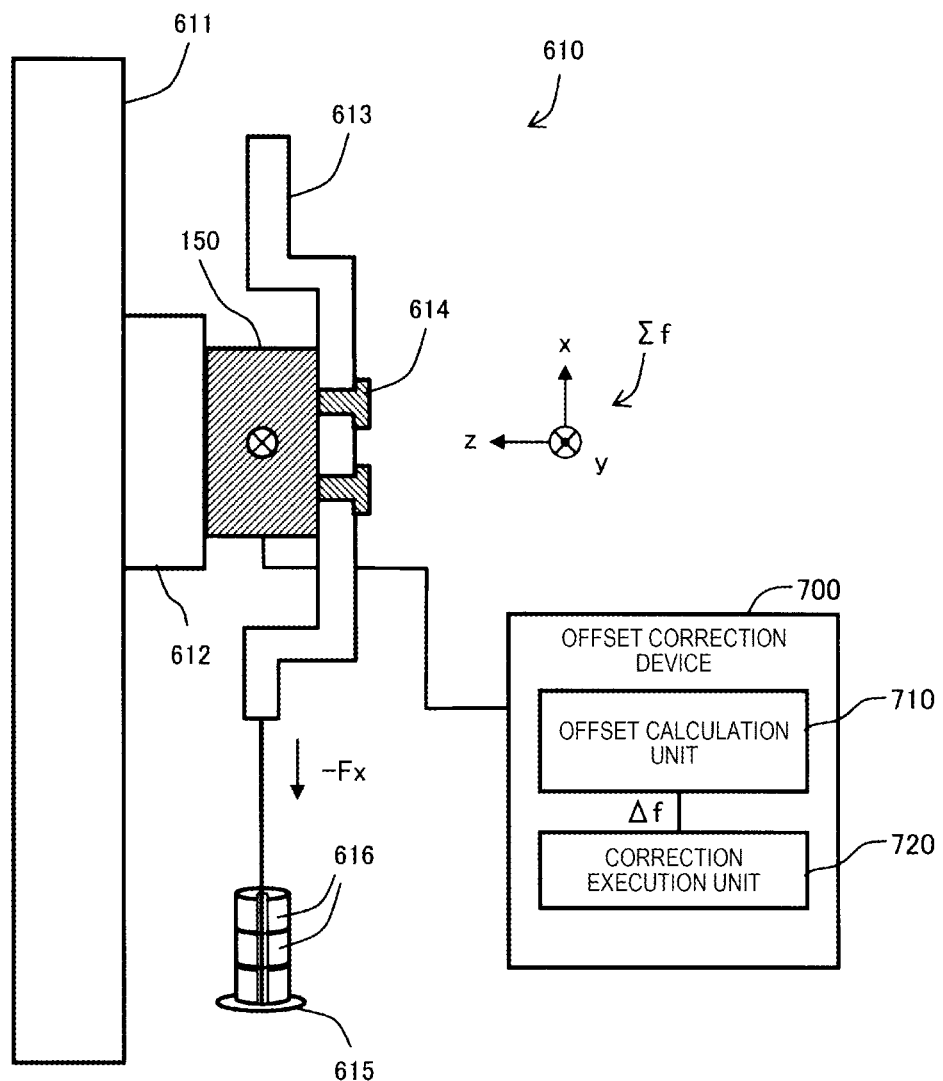
FIG. 12 is an explanatory diagram illustrating a configuration of a measurement device used for sensor calibration.

FIG. 12 is an explanatory diagram illustrating a configuration of a measurement device 610 used for sensor calibration. The measurement device 610 includes a base 612 installed on a vertical wall surface 611, and the force sensor 150 is installed on the vertical surface of the base 612. In FIG. 12, a sensor coordinate system $\Sigma f$ of the force sensor 150 is illustrated. In this example, the force sensor 150 is installed on the base 612 in a state in which the x direction of the sensor coordinate system $\Sigma f$ is oriented vertically upward. The measurement device 610 further includes a hanging jig 613 that is solidified on the surface (force sensing surface) of the force sensor 150, and a hanging tray 615 that is hung vertically downward from the hanging jig 613. The hanging jig 613 is fixed to the force sensor 150 by using a screw 614. One or more weights 616, which are reference weights whose weights are accurately measured in advance, can be placed on the hanging tray 615. The force sensor 150 is connected to an offset correction device 700. The offset correction device 700 includes an offset calculation unit 710 and a correction execution unit 720. The offset correction device 700 includes an offset correction function similar to that of the offset correction unit 62 illustrated in FIG. 5.

When the measurement device 610 is used, the force −Fx to be applied in the −x direction of the force sensor 150 can be accurately set by the weight 616. Accordingly, it is possible to calibrate the force sensor 150 so that the force Fx in the x direction of the output F(i) from the force sensor 150 in this state accurately coincides with the force corresponding to weight of the weight 616.

Figure 13:
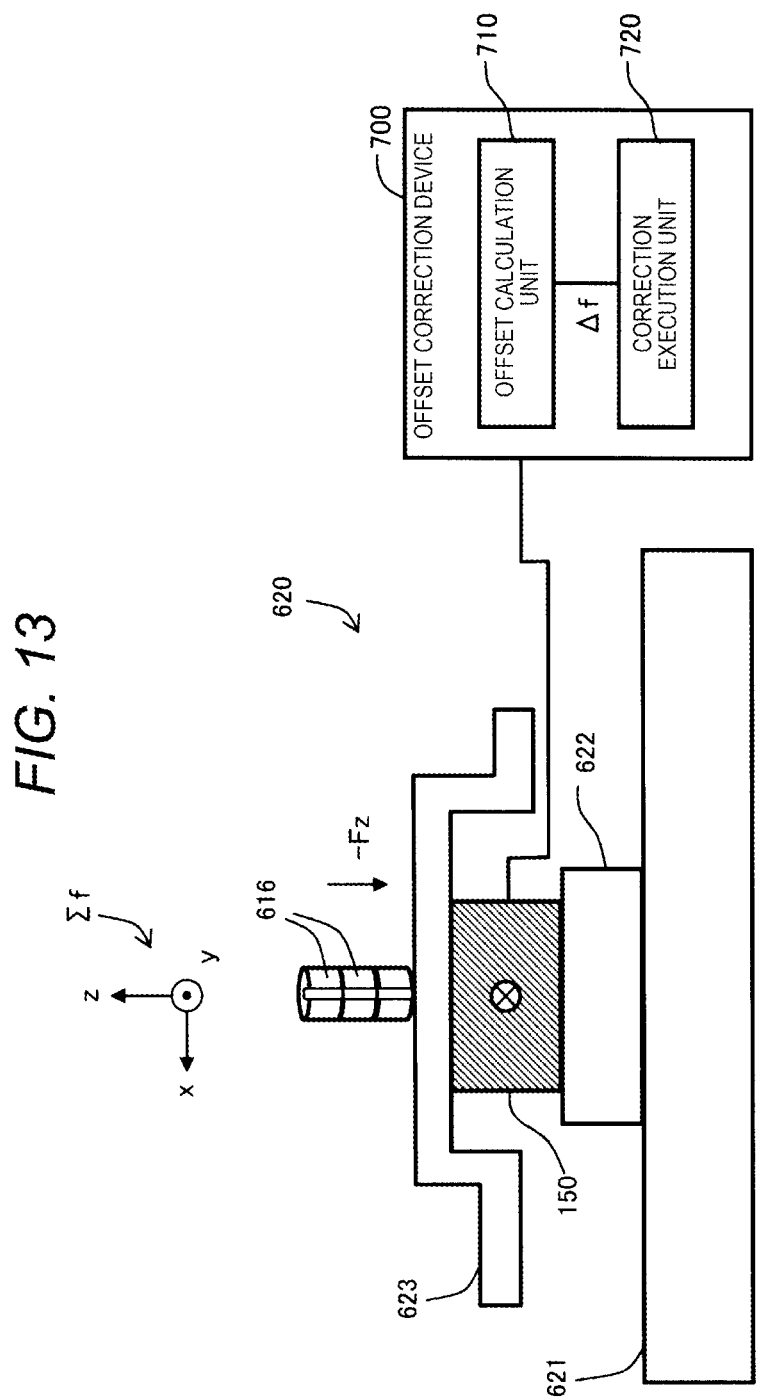
FIG. 13 is an explanatory diagram illustrating a configuration of another measurement device used for sensor calibration.

FIG. 13 is an explanatory diagram illustrating a configuration of another measurement device 620 used for sensor calibration. The measurement device 620 includes a base 622 installed on a horizontal table surface 621, and the force sensor 150 is installed on the horizontal surface of the base 622. In this example, the force sensor 150 is installed on the base 622 in a state in which the z direction of the sensor coordinate system Σf is oriented vertically upward. The measurement device 620 further includes a jig 623 which is solidified on the surface (force sensing surface) of the force sensor 150. One or more weights 616 can be placed on the jig 623. The force sensor 150 is connected to the offset correction device 700, similarly as in FIG. 12.

When the measurement device 620 is used, the force −Fz to be applied in the −z direction of the force sensor 150 can be accurately set by the weight 616. Accordingly, it is possible to calibrate the force sensor 150 so that the force Fz in the z direction of the output F(i) from the force sensor 150 in this state accurately coincides with the force corresponding to weight of the weight 616.

The measurement devices 610 and 620 illustrated in FIGS. 12 and 13 are examples of the measurement device used in step S310 of FIG. 11, and any measurement device other than the measurement devices can be used. A similar measurement device is also used for calibration of the force Fy in the y direction and the torques Tx, Ty, and Tz around three axes.

In step S320 of FIG. 11, the offset correction device 700 executes offset correction processing of the force sensor 150. This offset correction processing is the same as processing described in the first embodiment in accordance with FIGS. 7A to 7C and FIG. 8. With this offset correction processing, the offset Δf with respect to the output Vd of the plurality of force detection units 40 is obtained. After this, the offset-corrected signal Vc obtained by subtracting the offset Δf from the output Vd of the force detection unit 40 according to the equation (1) described above is used.

In step S330, weight of the weight 616 placed on the measurement device is sequentially changed, and the force is detected by the force sensor 150. Weight of the weight 616 can be changed, for example, every 5 kgf. In step S340, data obtained for a plurality of weights is linearized. This linearization is processing for correcting the offset-corrected signal Vc so that the offset-corrected signal Vc obtained with a plurality of weights has a substantially linear relationship with respect to weight of the weight. Processing in steps S330 and S340 is performed for each detection axis of the force sensor 150.

In step S350, using data on the plurality of detection axes obtained in step S340, a transformation matrix for converting the outputs Vd of the plurality of force detection units 40 into a plurality of forces F(i) is calculated. In step S360, the obtained transformation matrix is registered in the signal processing circuit 60 (FIG. 5) of the force sensor 150. In step S370, the offset of the force sensor 150 is checked. This processing can be performed, for example, by executing the same processing as steps S110 to S140 in FIG. 8 to obtain the offset Δf. If this offset Δf is approximately the same as the offset obtained in step S320 in FIG. 11, it is determined that there is no problem and calibration is ended. On the other hand, in a case where the offset Δf obtained in step S370 differs from the offset obtained in step S320 by more than the allowable error, processing in step S320 and subsequent steps may be executed again.

As described above, in the third embodiment, the offset correction processing similar to that in the first embodiment is executed when calibration of the force sensor 150 is performed, so that it is possible to accurately calibrate the force sensor 150. Also, in the first embodiment and the second embodiment described above, if the force conversion unit 66 (FIG. 5) of the signal processing circuit 60 uses the transformation matrix obtained by the calibration, it is possible to more accurately detect the force using the force sensor 150.

The invention is not limited to the embodiments, examples, or modification examples described above and can be embodied in various aspects in a range without departing from the gist thereof. For example, technical features of the embodiments, the examples, and the modification examples corresponding to technical features of respective aspects described in Summary section can be appropriately replaced or combined in order to solve some or all of the problems described above or achieve some or all of effects described above. When the technical features are not explained as essential ones, the technical features can be deleted.

In addition to an "averaging method", "applying a filter having an appropriate time constant" functions as a method of calculating the offset, as a method for reducing the influence of external vibration during the offset calculation period. For example, a value obtained by smoothing the sensor output using a smoothing filter can be offset and used. That is, in the offset calculation operation, a value based on the sensor output during the offset calculation period can be calculated as an offset.

It is also possible to embody the invention of the present application in combination with resetting the force sensor during moving at a constant speed, as described in JP-A-2015-182164 disclosed by the present applicant.

The entire disclosure of Japanese Patent Application No. 2017-173869, filed Sep. 11, 2017 is expressly incorporated by reference herein.

What is claimed is:

1. A robot comprising:
    a robot arm;
    a force sensor that is provided on the robot arm; and
    a processor that is configured to execute computer-executable instructions so as to control the robot and process a sensor output of the force sensor,
    wherein the processor is configured to:
    set an offset calculation period after resetting the force sensor; and
    perform an offset calculation operation for calculating a value based on the sensor output during the offset calculation period as an offset and a correction operation for subtracting the offset from the sensor output at the time of force detection after the elapse of the offset calculation period.

2. The robot according to claim 1,
    wherein a value based on the sensor output is an average value of the sensor output during the offset calculation period.

3. The robot according to claim 2,
    wherein the force sensor includes a plurality of a force detection element and a plurality of an amplification circuit amplifying an output signal of the force detection element, and the processor is configured to execute the offset calculation operation and the correction operation using the output signal of the amplification circuit as the sensor output.

4. The robot according to claim 3,
wherein the processor is configured to convert an offset-corrected signal obtained by performing the correction operation on an output signal of the amplification circuit into a force signal representing a force relating to each of a plurality of detection axes.

5. The robot according to claim 2,
wherein the force sensor outputs a force signal representing a force relating to each of a plurality of detection axes, and
the processor is configured to execute the offset calculation operation and the correction operation by using the force signal relating to each of the plurality of detection axes as the sensor output.

6. The robot according to claim 2,
wherein the processor is configured to set the offset calculation period to a period corresponding to N cycles (N is an integer of 1 or more) of natural vibration of an arm end included in the robot arm provided with the force sensor.

7. The robot according to claim 2,
wherein the processor is configured to set a standby period to wait until the sensor output is stabilized, before the offset calculation period.

8. The robot according to claim 1,
wherein the force sensor includes a plurality of a force detection element and a plurality of an amplification circuit amplifying an output signal of the force detection element, and
the processor is configured to execute the offset calculation operation and the correction operation using the output signal of the amplification circuit as the sensor output.

9. The robot according to claim 8,
wherein the processor is configured to convert an offset-corrected signal obtained by performing the correction operation on an output signal of the amplification circuit into a force signal representing a force relating to each of a plurality of detection axes.

10. The robot according to claim 1,
wherein the force sensor outputs a force signal representing a force relating to each of a plurality of detection axes, and
the processor is configured to execute the offset calculation operation and the correction operation by using the force signal relating to each of the plurality of detection axes as the sensor output.

11. The robot according to claim 1,
wherein the processor is configured to set the offset calculation period to a period corresponding to N cycles (N is an integer of 1 or more) of natural vibration of an arm end included in the robot arm provided with the force sensor.

12. The robot according to claim 1,
wherein the processor is configured to set a standby period to wait until the sensor output is stabilized, before the offset calculation period.

13. An offset correction device for correcting an offset of a force sensor, comprising:
a processor that is configured to process a sensor output of the force sensor,
wherein the processor is configured to:
set an offset calculation period after resetting the force sensor;
calculate a value based on an output of the force sensor during the offset calculation period as an offset; and
subtract the offset from the output of the force sensor at the time of force detection after the elapse of the offset calculation period.

14. The offset correction device according to claim 13,
wherein a value based on the sensor output is an average value of the sensor output during the offset calculation period.

15. The offset correction device according to claim 14,
wherein the processor is configured to set a standby period to wait until the sensor output is stabilized, before the offset calculation period.

16. The offset correction device according to claim 13,
wherein the processor is configured to set a standby period to wait until the sensor output is stabilized, before the offset calculation period.

* * * * *